Oct. 3, 1950　　　　　　　B. M. HYMAN　　　　　　2,524,196
FLOATING PICKUP DEVICE FOR ATTACHMENT
TO AGRICULTURAL IMPLEMENT PLATFORMS
Filed Aug. 17, 1946　　　　　　　　　　　　　3 Sheets-Sheet 3

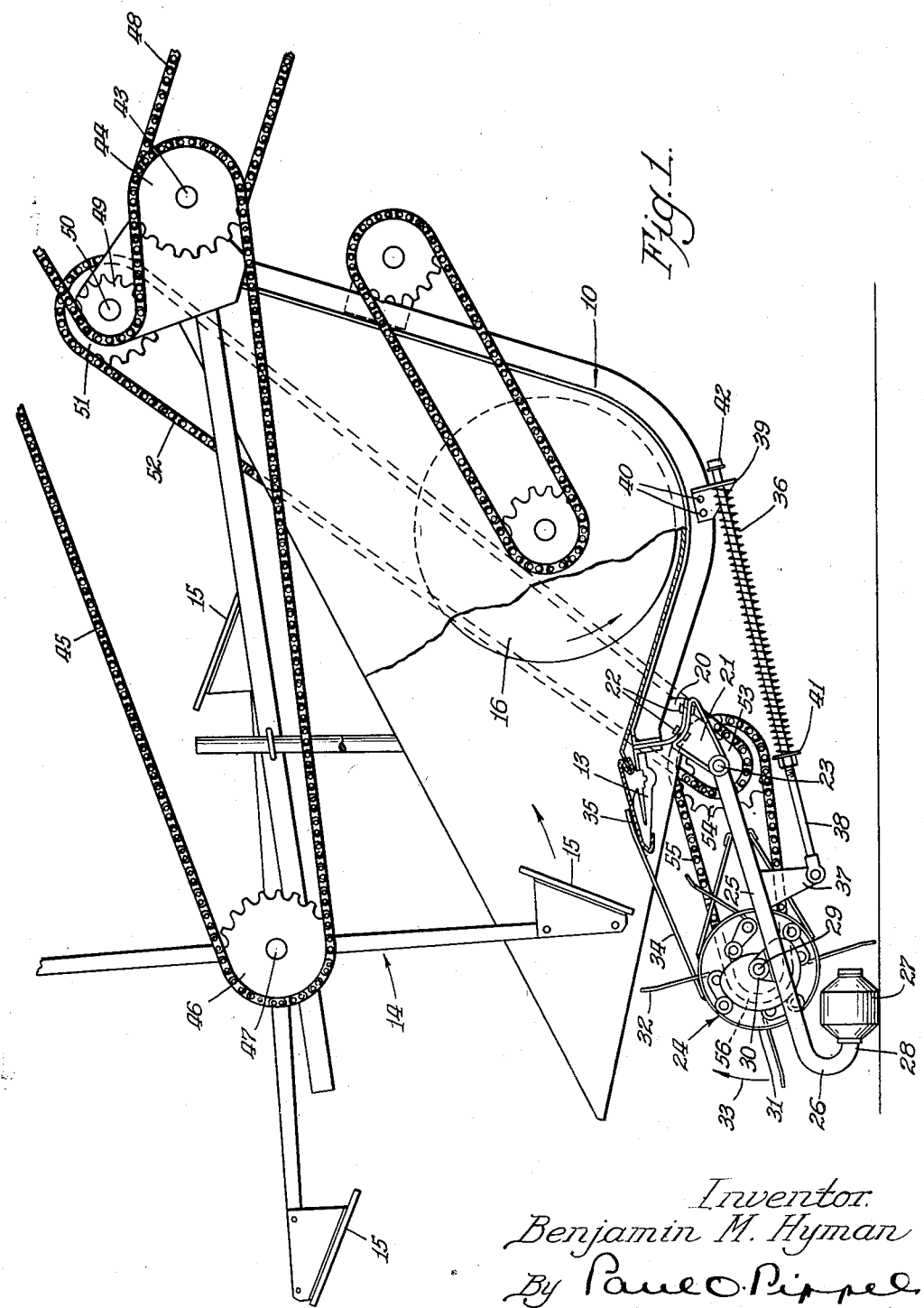

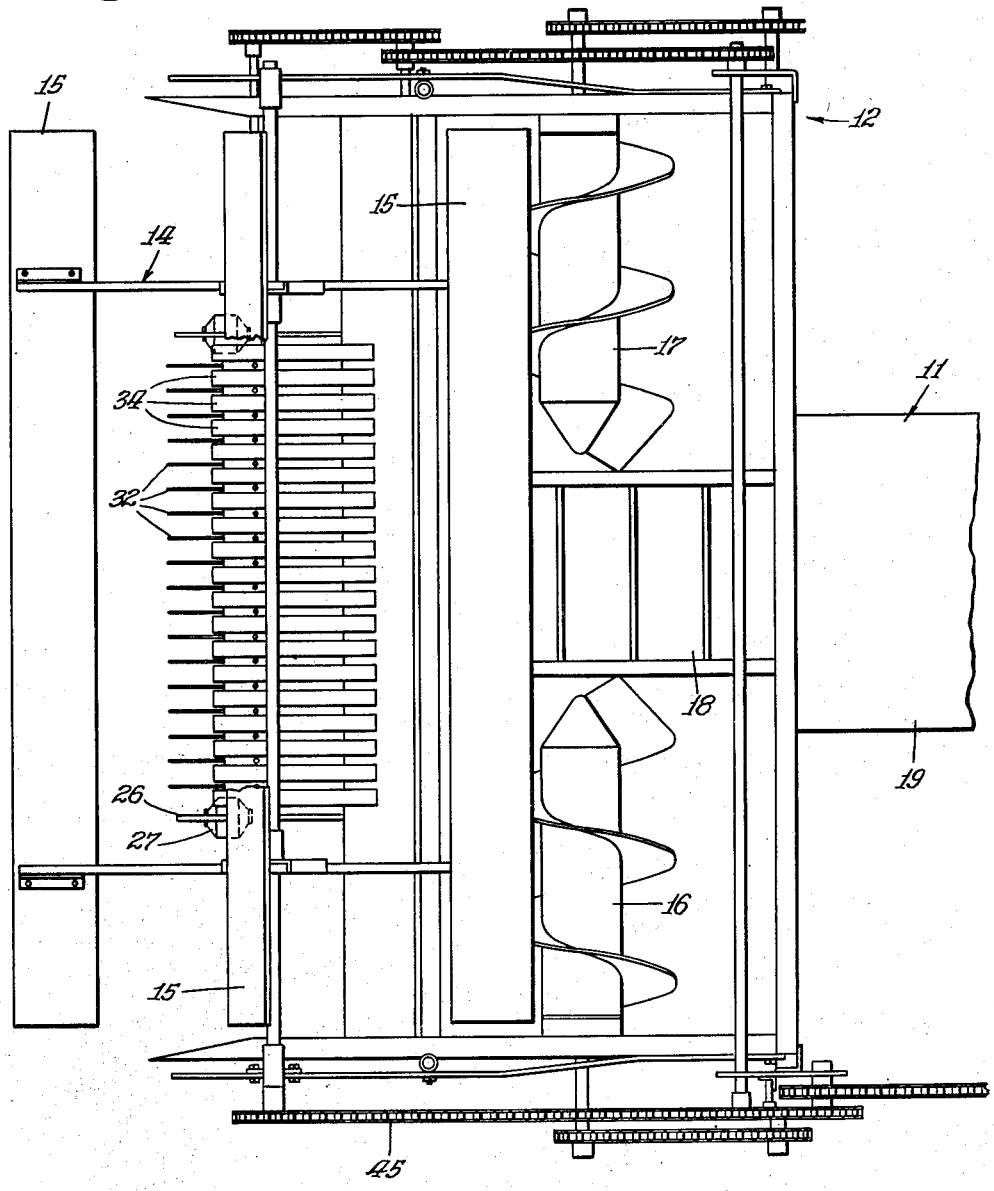

Inventor.
Benjamin M. Hyman
By Paul O. Pippel
Atty.

Patented Oct. 3, 1950

2,524,196

UNITED STATES PATENT OFFICE 2,524,196

FLOATING PICKUP DEVICE FOR ATTACHMENT TO AGRICULTURAL IMPLEMENT PLATFORMS

Benjamin M. Hyman, Moline, Ill., assignor to International Harvester Company, a corporation of New Jersey Application August 17, 1946, Serial No. 691,261

5 Claims. (Cl. 56—364)

1

This invention relates to a new and improved pick-up device for attachment to agricultural implement platforms and more particularly to the provision of means for attaching a pick-up to a harvester thresher or a windrower or the like without interfering with the regular platform feeding devices such as a reel.

This invention is an improvement over the application of Stuart D. Pool Serial No. 630,298, filed November 23, 1945, and now matured into Patent No. 2,488,738 and entitled "Floating Pick-Up."

An important object of this invention is to provide a floating pick-up attachment for agricultural implement platforms which have a shield means clamped over the regular sickle at the forward end of the platform.

Another important object of this invention is the provision of means for providing a counterbalancing means for a floating pick-up attachment for agricultural implements.

A further object of this invention is to provide a floating pick-up attachment for agricultural implements, such as harvester threshers or windrowers, which may be pulled by the implement and yet deliver material to the regular platform of the machine without interfering with the conveying elements mounted above the regular platform.

Still another object of this invention is to provide driving mechanism for a floating pick-up attachment for agricultural implements.

Other and further important objects of this invention will become apparent from the disclosures in the following specification and accompanying drawings, wherein:

Figure 1 is a side elevational view partially in section of the pick-up attachment of this invention shown mounted on an agricultural implement platform.

Figure 2 is a top plan view of the device as shown in Figure 1.

As shown in the drawings:

Figure 4:
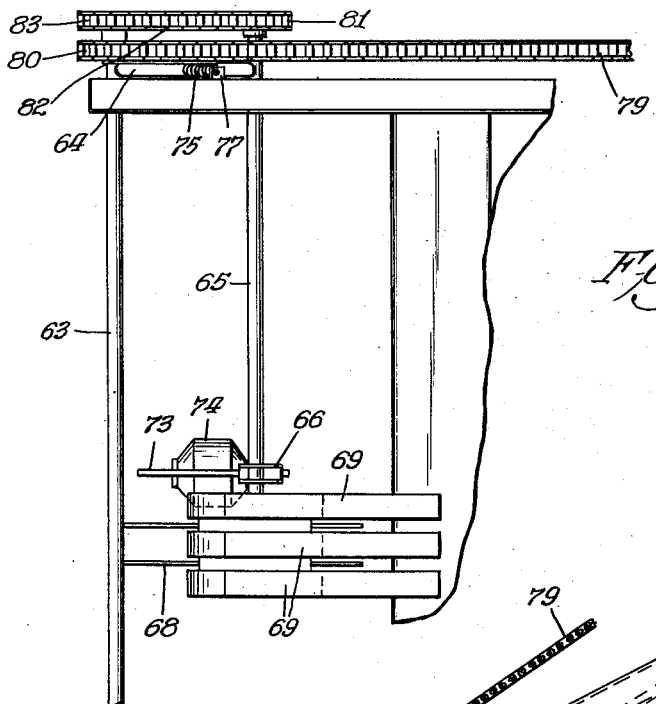
Figure 4 is a partial top plan view of the device as shown in Figure 3.

The reference numeral 10 indicates generally a platform forming part of a harvester thresher 11. The regular platform 10 is of the scoop-shovel type and is pivoted for adjustable movement about its upper end 12. In regular operation of the harvester thresher 11 the machine is propelled through a field of standing grain, whereupon the grain is cut by means of a sickle 13 provided along the forward edge of the platform 10. As the sickle cuts the grain at any desired level a reel 14 having bats 15 pushes the grain rearwardly over the surface of the platform 10 into auger conveyers 16 and 17. These auger conveyers are positioned transversely of the platform 10 and, as shown in Figure 2, are adapted to feed the cut grain toward the center of the platform 10 to a central conveyer 18 which is in the form of an endless canvas conveyer adapted to carry the cut grain rearwardly and upwardly into a threshing portion 19 of the harvester thresher 11. The relatively high hinge point of the platform 10 makes it necessary to provide a separately floatable pick-up attachment instead of merely attaching a pick-up device rigidly to the forward end of the platform. This is better shown and described in the copending application of Stuart D. Pool mentioned above.

Beneath the forward end of the platform 10 is a bracket member 20 to which is attached another bracket member 21 by bolts 22. The second bracket 21 is hingedly mounted at its other end to a hinge shaft 23 and forms a part of a floating pick-up attachment 24 of this invention. The bracket 21 may be left on the under side of the platform 10 and the hinge pin 23 either withdrawn or inserted to remove or attach the pick-up device 24 from or to the platform 10.

The pick-up device 24 is provided with a pair of spaced apart arms 25 hinged at their rear about the shaft 23 and curved forwardly and under as shown at 26 for journally carrying a roller skid member 27. The rearwardly extending portion 28 of the arms 25 provides a longitudinally extending shaft about which skid member 27 may rotate so that if the agricultural implement has lateral movement the pick-up attachment is permitted to slide laterally in the same manner about its roller skid members 27.

A shaft 29 is carried by the arms 25 within pillow block bearings or the like 30. A cylinder 31 is mounted on the shaft 29 and is provided with spring-held raking tines 32 projecting radially from the cylinder 31. The cylinder 31 is adapted to be rotated in a direction indicated by an arrow 33 as shown in Figure 1. By means of a shield 34 which has spaced slots for the passage of the raking tines 32, material may be picked up from windrows or the like and deposited on the shield 34 and thereupon picked up by the reel bat 15 and thrown rearwardly over the sickle 13 which has been completely covered by a clamp member 35 forming a rear part of the shield 34 and within the range of the transversely transporting augers 16 and 17.

The pick-up device 24 has floating movement about the hinge shaft 23, and when the pick-up is pushed or drawn over irregular terrain the roller skid member 27 will follow the contour of the ground, thus maintaining the raking tines 32 in proper pick-up position. When the pick-up strikes an obstruction it is necessary that it yield upwardly thus permitting the implement to pass over the obstruction without damaging any part of the pick-up or the implement. In order that the pick-up easily ride over obstructions, a counter-balancing spring 36 is adapted to exert an upward force about the hinge 23 of the pick-up. A bracket 37 depending from the arm 25 of the pick-up is adapted to carry one end of a link member 38. The other end of the link is slidably journaled within a bracket 39 depending from and attached to the under side of the platform 10 at 40. A collar 41 is adjustable along the link 38 and the spring 36 is adapted to be positioned between the collar 41 and the bracket 39 exerting an outward force against these two members. Inasmuch as the bracket 39 is fixed, movement occurs only in a forward direction causing a lifting of the pick-up arms 25 about the hinge 23. The force of the spring 36 is dependent upon the position of the collar 41. In its normal position the spring is adjusted so that it just balances the weight of the pick-up, and as a result the pick-up floats with relative ease although as the pick-up is raised from the ground line the spring contributes less to its raising. A stop member 42 is provided on the end of the link 38 beyond the bracket 39, thus limiting the amount of lift the pick-up can make.

A drive shaft 43 about which the scoop shovel platform 10 is hinged is adapted to drive the reel and also the pick-up device. A sprocket 44 fastened to the shaft 43 effects a driving of the reel 14 by means of a chain 45 extending around a sprocket 46 on a reel shaft 47. The shaft 43 receives its driving power from the rearwardly positioned threshing device 19 by means of a chain 48 projecting forwardly and around a sprocket fastened to the drive shaft 43. The reel chain 45 extends around an idler sprocket 49 mounted on a jack shaft 50 which carries a larger sprocket 51 adapted to drive the pick-up by means of a chain 52 extending down and around a sprocket 53 mounted on the hinge shaft 23. Another sprocket 54 keyed or otherwise fastened to the same shaft 23 carries a chain 55 and proceeds forwardly about a sprocket 56 on the shaft 29 which carries the pick-up cylinder 31. It is evident therefore that as the floating pick-up swings about the hinge 23 the chain drive continues uninterruptedly.

Figure 3:
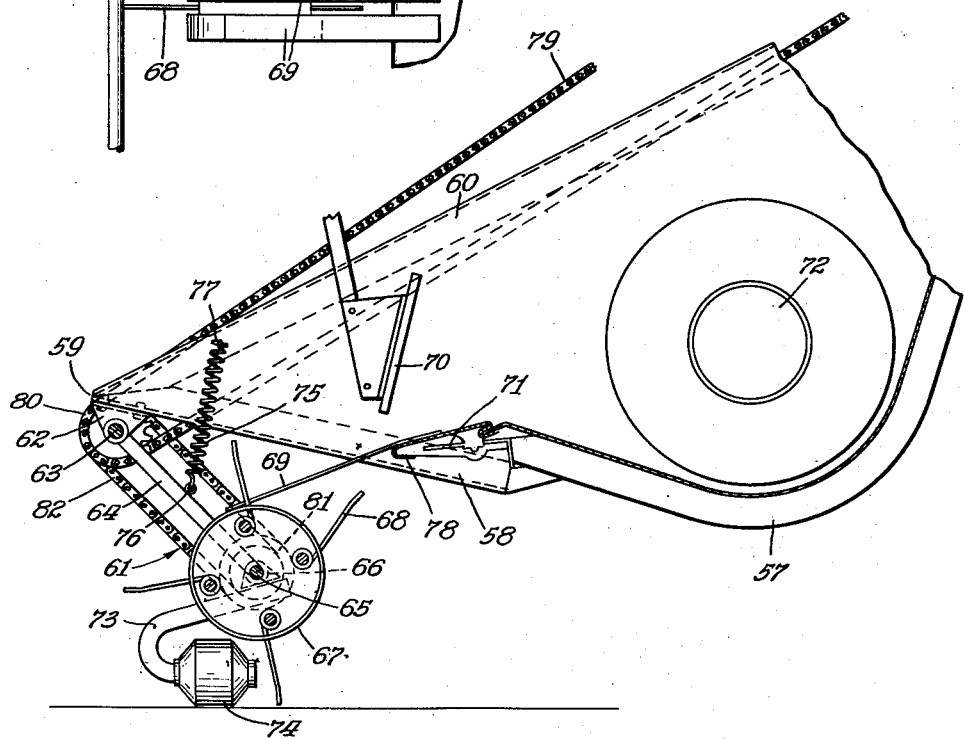
Figure 3 is a view similar to Figure 1 showing a modified form of attachment for the floating pick-up device of this invention.

In some instances it is desirable to pull the pick-up device rather than push it as shown in Figures 1 and 2. Figure 3 shows a harvester thresher platform 57 having a pair of spaced supporting members or arms 58 rigidly attached to the under and forward side of the platform 57 and extending forwardly and upwardly to the point 59. Brace members 60 projecting downwardly and forwardly from the thresher part of the harvester thresher join with the arms 58 at 59, and the supporting members 58 and the brace members 60 combine to form an adequate support for a pick-up device 61. Hanger-type bearings 62 are provided on the under side and at the forward ends of the supporting members 58 and carry a shaft 63 about which the pick-up device 61 arcuately floats. Arms 64 are hinged on the shaft 63 and at their lower ends are attached to a shaft 65 journally supported in pillow block bearings 66. A pick-up cylinder 67 is carried on the shaft 65 and has radially extending spring fingers 68 adapted to pick up hay or other material and lift it up and over a shield composed of spring strips 69 similar to the shield 34 as shown in Figures 1 and 2 which lie loosely over the pick-up cylinder. Reel bats 70 receive the crop at this point and carry it over a guarded sickle 71 and back to transversely conveying augers 72.

The pillow block bearings 66 are mounted on supporting arms 73 which journally support roller skid members 74 similar to the roller skids 27 as shown in Figure 1. A counter-balancing spring 75 joins the hinge arms 64 at 76 to the upper brace members 60 at 77. The spring is a tension spring as distinguished from the compression spring 36 shown in Figure 1. The spring is adapted to aid in the lifting of the pick-up 61 when it strikes an obstruction.

In the device as shown in Figure 3 the pulling of the pick-up has a distinct advantage in that there is no possibility of the obstruction so striking the pick-up that it will not raise. In a forwardly moving implement the pick-up device as shown in Figure 3 would normally move rearwardly and upwardly upon striking an obstruction and thereupon prevent destruction of any of the elements of the pick-up or harvester thresher. In this modification the regular reel is used without change and the sickle drive is permitted to operate by reason of a clamp-like guard 78 mounted thereover in a manner similar to that shown at 35 in Figure 1 and fixedly attached to the forwardly and downwardly extending spring strips 69.

The drive for the pick-up of Figure 3 is shown as projecting forwardly and downwardly through a chain 79 and driving a sprocket 80 which is fastened to the shaft 63 about which the pick-up device is arcuately hinged. A sprocket 81 mounted on the shaft 65 is driven by a chain 82 from a sprocket 83 as shown in Figure 4. The floating movement of the pick-up device does not affect the length of the driving chain 82 for the reason that the sprocket 80 is mounted directly on the hinge shaft 63.

Numerous details of construction may be varied throughout a wide range without departing from the principles disclosed herein, and I therefore do not propose limiting the patent granted hereon otherwise than as necessitated by the appended claims.

What is claimed is:

1. A material pick-up device for attachment to farm implements of the type having platforms with a sickle at the forward end and a reel adapted to rotate thereabove to move material back over the platform, comprising a cylinder having raking tines mounted forwardly of and beneath the platform, spaced arms rigidly attached to the sides of said platform and extending upwardly and forwardly thereof, and cylinder supporting arms hingedly attached at their upper ends to the forward ends of the spaced arms and extending rearwardly and downwardly therefrom, said cylinder journaled in the lower rear ends of said hinged supporting arms for arcuate floating movement relative to the rigidly attached spaced arms.

2. A material pick-up device for attachment to farm implement platforms of the type having a sickle at the forward edge thereof, comprising a cylinder having raking tines, arms journally supporting the ends of said cylinder and hingedly attached to the implement, ground-engaging skid means for said pick-up cylinder, shield means covering the sickle at the forward edge of the platform and extending forwardly and downwardly over the said cylinder, and forwardly and upwardly extending supporting members rigidly attached to the implement platform, said cylinder supporting arms hingedly attached to the forward ends of said supporting members and extending downwardly and rearwardly whereby the pick-up device is in effect pulled by the implement.

3. A material pick-up device for attachment to farm implement platforms of the type having a sickle at the forward edge thereof, comprising a cylinder having raking tines, arms journally supporting the ends of said cylinder and hingedly attached to the implement, ground-engaging skid means for said pick-up cylinder, shield means covering the sickle at the forward edge of the platform and extending forwardly and downwardly over the said cylinder, and forwardly and upwardly extending supporting members rigidly attached to the implement platform, said cylinder supporting arms hingedly attached to the forward ends of said supporting members and extending downwardly and rearwardly whereby the pick-up device is in effect pulled by the implement, said shield means being clamped to said sickle.

4. A pick-up for attachment to a scoop-type auger combine platform having a sickle means along its leading edge, support means connected to and extending forwardly of said edge, a shield clamped to the sickle means including forwardly extending deck structure, a pick-up cylinder carried by ground supports and connected for floating movement in relation to the platform, means to drive said cylinder to load crop material from the ground onto said deck structure, said support means including structural beams extending downwardly and forwardly from an upper portion of said scoop platform and structural beams extending upwardly and forwardly from a lower portion of said scoop platform, said structural beams joined at their forward ends, said pick-up cylinder having forwardly and upwardly extending arms for pivotal attachment to the juncture of the said structural beams to effect floating movement of said pick-up cylinder.

5. A pick-up for attachment to a scoop-type auger combine platform having a sickle means along its leading edge, support means connected to and extending forwardly of said edge, a shield clamped to the sickle means including forwardly extending deck structure, a pick-up cylinder carried by ground supports and connected for floating movement in relation to the platform, means to drive said cylinder to load crop material from the ground onto said deck structure, said support means including structural beams extending downwardly and forwardly from an upper portion of said scoop platform, structural beams extending upwardly and forwardly from a lower portion of said scoop platform, said structural beams joined at their forward ends, said pick-up cylinder having forwardly and upwardly extending arms for pivotal attachment to the juncture of the said structural beams to effect floating movement of said pick-up cylinder, and a counter-balancing spring attached to the upper of said structural beams and to the pivotally attached arms carrying the pick-up cylinder, whereby an upward force is provided on the pick-up cylinder so that it will yield upwardly upon striking an obstruction.

BENJAMIN M. HYMAN.

REFERENCES CITED

The following references are of record in the file of this patent:

UNITED STATES PATENTS

| Number | Name | Date |
|---|---|---|
| 1,896,626 | Innes | Feb. 7, 1933 |
| 2,233,837 | Fuhrhop | Mar. 4, 1941 |
| 2,252,376 | Hyman | Aug. 12, 1941 |
| 2,324,261 | Krause | July 13, 1943 |
| 2,363,888 | Martin | Nov. 28, 1944 |
| 2,378,107 | Russell | June 12, 1945 |
| 2,431,828 | Raney | Dec. 2, 1947 |
| 2,450,082 | Crumb et al. | Sept. 28, 1948 |